United States Patent

[11] 3,625,829

[72] Inventors Gunther Schmidt-Kastner; Johann Putter, both of Wuppertal-Elberfeld, Germany

[21] Appl. No. 780,903
[22] Filed Dec. 3, 1968
[45] Patented Dec. 7, 1971
[73] Assignee Farbenfabriken Bayer Aktiengesellschaft Leverkusen, Germany
[32] Priority Dec. 4, 1967
[33] Germany
[31] P 16 42 614.5

[54] PURIFICATION OF CARBOXYPEPTIDASE B
7 Claims, No Drawings

[52] U.S. Cl. 195/66 R
[51] Int. Cl. C07g 7/02
[50] Field of Search 195/62, 66; 424/92; 260/112, 118

[56] References Cited

UNITED STATES PATENTS

| | | | |
|---|---|---|---|
| 3,073,747 | 1/1963 | Reid | 424/92 |
| 3,234,199 | 2/1966 | Reid | 195/66 X |
| 3,419,471 | 12/1968 | Matsuoka et al. | 195/66 |

OTHER REFERENCES

Keller, et al., J. Biol. Chem. Vol. 233 1958 (pages 344–349).

*Primary Examiner*—Lionel M. Shapiro
*Assistant Examiner*—D. M. Naff
*Attorney*—McCarthy, Depaoli, O'Brien & Price

ABSTRACT: Carboxpeptidase B is purified by treating aqueous crude solutions of the carboxypepeptidase B simultaneously with cation exchangers and anion exchangers.

PURIFICATION OF CARBOXYPEPTIDASE B

BACKGROUND OF THE INVENTION

1. Field of the Invention

This invention relates to purification procedures for carboxypeptidase B and more particularly to a process wherein carboxypeptidase B is purified by use of cation exchangers and anion exchangers.

2. Description of the Prior Art

Carboxypeptidase B is a peptidehydorlase containing one mole of zinc as a metallo enzyme which splits off the carboxylene-terminal amino acids, arginine and lysine, from peptides and proteins. For example, the splitting off of the carboxylene-terminal arginine from kinines may be mentioned. The kinines, being biologically highly active, are spontaneously inactivated. Thus, carboxypeptidase B is useful in the therapeutic field as a kinine-inactivator and therefore finds varied uses in this area.

Pancreas extracts are used as source materials for the preparation of carboxypeptidase B. One process for obtaining carboxypeptidase B has been described by J. E. Folk et al., J. Biol. Chem. 235, (1960)page 2272. According to this art method, the enzyme is purified by column chromatography by treatment with DEAE-cellulose, i.e. diethylaminoethyl cellulose. However, the column chromatography is time consuming and can only be carried out with great expense on a technical scale.

The pancreas extracts used for the preparation of carboxypeptidase B also contain other enzymes, e.g. kallikrein and trypsin. Both enzymes prevent the therapeutic use of carboxypeptidase B. The biological action of kallikrein, for example, which is a high molecular weight protein used in the treatment of an peripheral vascular disorder, counteracts the biological action of carboxypeptidase B. Thus kallikrein forms kinines whereas carboxypeptidase B destroys kinines. Kallikrein is a strongly acidic protein whereas trypsin is a strongly basic protein. Hence, the separation of these components and recovery of the desired carboxypeptidase B therefore has, to the present, been difficult and unsatisfactory.

To separate kallikrein, cation exchangers, such as DEAE-cellulose, have been normally used; to separate trypsin, anion exchangers, such as CM-cellulose, are normally used. In a technical process for the separation of kallikrein and trypsin, the crude solution of carboxypeptidase B has been successively extracted by stirring first with a cation exchanger, e.g. DEAE-cellulose. However, the selectivity of such a process is limited. When the cation exchanger is used, not only all of the kallikrein is adsorbed, but also the carboxypeptidase B. Likewise, when an anion exchanger is used, not only all trypsin is adsorbed, but also the carboxypeptidase B. Therefore, a clear need remains in the art for procedures whereby carboxypeptidase B can be purified efficiently in a single step and separated from the other components contained in the solution.

SUMMARY OF THE INVENTION

It is accordingly one object of the present invention to provide procedures which overcome or otherwise mitigate these problems of the prior art.

A further object of the invention is to provide a procedure wherein carboxypeptidase B is purified by simultaneous treatment with cation and anion exchange resins.

Other objects and advantages of the present invention will become apparent as the description thereof proceeds.

In accordance with this invention, it has now been found that cation exchangers and anion exchangers can simultaneously be used for the purification of carboxypeptidase B. This simultaneous use of cation and anion exchangers represents a clear and advantageous advance in the art.

DESCRIPTION OF PREFERRED EMBODIMENTS

As mentioned above, the prior art procedure for purifying carboxypeptidase B gives rise to problems where cation and anion exchangers are used successively. Thus in the prior art procedure not only the kallikrein, but also the carboxypeptidase B is adsorbed with the use of the cation exchanger. Then with the use of the anion exchanger, all of the trypsin but also the carboxypeptidase B is adsorbed. It is immaterial whether the extraction is first carried out with the cation exchanger and then with the anion exchanger, or first with the anion exchanger and then with the cation exchanger. In either case, the results are unsatisfactory for the reasons described above.

According to this invention, it has been found that the simultaneous use of cation exchangers and anion exchangers increases the selectivity of the separation. The simultaneous use of cation and anion exchangers reduces the undesired adsorption of the carboxypeptidase B and leads to higher yields. Moreover, the carboxypeptidase B is obtained substantially free of any kallikrein and trypsin contained in the solution.

As starting materials for obtaining the carboxypeptidase B, there may be used pancreas extracts or, according to known methods of protein chemistry, precleaned crude solutions of carboxypeptidase B may be used. Hence, the particular source of the starting material is not critical and may be selected as desired. The starting material is preferably used as an aqueous solution as described herein.

In practicing the purification process of this invention, the source solution containing the carboxypeptidase B and other components such as kallikrein and trypsin, is intimately contacted simultaneously with the cation exchanger and anion exchanger. In general, it is preferable to condition the exchangers prior to use. Thus, the anion exchanger may be conditioned for use by washing in sequence once with water, once with an alcohol such as methanol, once with water, three times with an acid, such as 0.5 M acetic acid and then about 10 times with water. The resulting anion exchanger is then sharply filtered off on a suction filter and stored in a wet-moist state for use.

The cation exchanger is preferably conditioned by washingin sequence once with water, once with an alcohol such as methanol, once with water, three times with a base, such as 0.5 M ammonia or an alkali metal hydroxide, and then about 10 times with water. The resulting cation exchanger is then sharply filtered off on a suction filter and stored in a wet-moist state for use.

The source solution containing the carboxypeptidase B is then charged to a suitable reactor provided with means for rapid agitation such as a stirrer, and a mixture of the conditioned anion exchanger and cation exchanger is added to the solution. Thereafter, the mixture is intensively agitated to obtain thorough mixing at about room temperature for a sufficient period to effect the separation. Periods of about 15 minutes to 4 hours have been found satisfactory with a period of about 30 minutes being satisfactory for a laboratory batch run. After completion of this period, the solution is then sharply filtered off with suction.

The resulting filtrate will be found to contain a substantial amount of the desired carboxypeptidase B with only minor amounts of the kallikrein and trypsin. Yields on the order of above 85 percent are obtained. The amount of kallikrein and trypsin contained in the filtrate will be generally below about 1 percent.

Any cation and anion exchangers which are operable can be used in practicing the process of this invention. In general, exchangers based on cellulose, synthetic resins and dextrans are highly preferable. Thus, as cation exchangers there may be mentioned diethylaminoethyl Sephadex, Sephadex being a registered trademark for an exchanger comprising a cross-linked dextran gel; diethylaminoethyl cellulose (DEAE-cellulose); triethylaminoethyl cellulose (TEAE-cellulose); Lewatit MP 600, a microporous cation exchanger based on polystyrenes cross linked with quaternary ammonia groups, Lewatit MIH, a condensation resin based on phenol-formaldehyde containing weakly alkaline dimethylamino groups, Lewatit being the trade name for a series of ion exchangers sold by Naftone Inc.;

Permutit Deacidite, a highly basic aliphatic amine-type cation exchanger sold by Permutit Company; Amberlite IRA 400, the latter being a trade name for ion exchangers sold by Rohm and Haas Co.; and the like. Anion exchangers which may be used include CM-cellulose; CM-Sephadex, Lewatit CNP, a macroporous anion exchanger based on a cross-linked polyacrylic acid; Amberlite IR 100, an anion exchange resin sold by Rohm and Haas Co.; Zeocarb H, an organic anion exchange resin sold by the Permutit Company, and equivalent materials of this type. It should be understood that any combination of cation and anion exchangers which will operate to effect the separation can be used as the novelty of the invention resides primarily in the manner of use and not the particular exchanger.

In the following table there is presented a graphic demonstration showing the advantages of purifying carboxypeptidase B with the process of this invention as compared with prior art processes of purifying by successive treatments with cation and anion exchangers. In this table, data is shown to illustrate the results obtained when carboxypeptidase B is successively extracted first with 130 grams DEAE-cellulose and then with 110 grams CM-cellulose. From this prior art procedure carboxypeptidase B is obtained in a yield of 75 percent. When a successive extraction is carried out first with 110 g. CM-cellulose and then with 130 g. DEAE-cellulose, carboxypeptidase B results in a yield of 46 percent. With the simultaneous use of 130 g. DEAE-cellulose and 110 g. CM-cellulose the yield rises to 86 percent. With the simultaneous use of 130 g. DEAE-cellulose and 110 g. CM-cellulose, kallikrein and trypsin are completely separated.

TABLE I

| Addition, grams DEAE-cellulose/ grams CM-cellulose to 2,000 ml. carboxypeptidase B crude solution | Component recovered, percent | | |
|---|---|---|---|
| | Carboxy-peptidase B | Kalli-krein | Trypsin |
| —/— (no addition) | 100 | 100 | 100 |
| 130/— | 78 | 2.2 | 107 |
| —/110 | 83 | 91 | 5 |
| 130/— then —/110 (successively) | 75 | 0.8 | 0.03 |
| —/110 then 130/— (successively) | 46 | <0.01 | 0.8 |
| 130/110 (simultaneously) | 86 | <0.01 | 0.2 |

The effectiveness of carboxypeptidase B is enzymatically determined with Nα-hippuryl-L-arginine as substrate. The carboxypeptidase B solutions are previously diluted to measure the effectiveness.

As solvent used for the predilution, a 0.05 M trisbuffer (pH 7.8is used which contains $2.3\times10^{-3}$ MD calcium chloride. 0.2 ml. of this prediluted carboxypeptidase B solution is placed into a graduated 1 cm-cuvette which contains 3 ml. of a $10^{-3}$ M $N_\alpha$-hippuryl-L-arginine solution. Into the control cuvette, 0.2 ml. of the solvent of tris-buffer and calcium chloride are added to 3 ml. of the $10^{-3}$ $N_\alpha$-hippuryl-L-arginine solution. The period of time is measured at 25° C., in which the extinction rises at 255 mμ from 0.040 to 0.100 (gap separation less than 0.4 mm.). As 1 carboxypeptidase B unit (CBU), the enzyme amount is defined which brings about an extinction modification of 2.9 within 1 minute. The effectiveness of kallikrein and the effectiveness of trypsin are determined with $N_\alpha$-benzoyl-L-arginine-ethyl ester hydrochloride as substrate according to known methods. This operation is carried out in such a way that the measurement is taken once with and once without soya bean-trypsin inhibitor. The sum total of the effectiveness of trypsin and kallikrein is measured without the soya bean-trypsin inhibitor. The effectiveness of kallikrein only is determined with soya bean-trypsin inhibitor. The effectiveness of trypsin is calculated from the difference of the two test values.

The process described herein is capable of being carried out on a technical scale. The product of the process, the carboxypeptidase B, can be used therapeutically, e.g. as kinine-inactivator as indicated above.

The following specific examples are presented to exemplify certain specific embodiments of the present invention. However, the invention is not to be considered as limited thereto.

In the following examples, parts are by weight unless otherwise indicated. In the following examples CBU is a carboxypeptidase B unit and KU is a kallikrein unit.

EXAMPLE I

CM-cellulose powder is washed in sequence as follows: once with water, once with methanol, once with water, three times with 0.5 M acetic acid and 10 times with water. The cellulose is sharply filtered off with suction on a suction filter and stored in a wet-moist state.

DEAE-cellulose powder is washed in the above sequence: once with water, once with methanol, once with water, three times with 0.5 M ammonia and 10 times with water. The cellulose is sharply filtered off with suction on a suction filter and stored in a wet-moist state.

One hundred thirty g. wet-moist DEAE-cellulose, pretreated as described above, and 110 grams wet-moist CM-cellulose, pretreated as described above, are simultaneously added to 2 l. of a carboxypeptidase B solution (pH 7.0) with 20.8 CBU/ml. (=41,600 CBU) which contains, as accompanying enzyme, kallikrein with 1,135 KU/ml. (=2,270,000 KU) and trypsin with 1.19 mg. trypsin/ml. (=2,380 mg. trypsin). The solution is intensively stirred for 30 minutes and sharply filtered off with suction. The filtrate contains 17.8 CBU/ml. (=35,600 CBU; 86 percent yield), less than 0.1 KU/ml. (= less than 200 KU; less than 0.01 percent) and 0.003 mg. trypsin/ml. (=6 mg. trypsin; 0.2 percent).

If, on the other hand, there are successively added to 2 l. of the same carboxypeptidase B solution (pH 7.0) with 20.8 CBU/ml. (=41,600 CBU) which contains, as accompanying enzyme, kallikrein with 1,135 KU/ml. (=2,270,000 KU) and trypsin with 1.19 mg. trypsin/mg. (=2,380 ml. trypsin), first 130 g. wet-moist DEAE-cellulose, the mixture is intensively stirred for 30 minutes, the DEAE-cellulose sharply filtered off with suction, 110 g. wet-moist CM-cellulose are then added to the filtrate, the mixture is again intensively stirred for 30 minutes and the CM-cellulose sharply filtered off with suction; a filtrate results with 15.6 CBU/ml. (=31,200 CBU; 75 percent yield) with 8.6 KU/ml. (=17,200 KU; 0.8 percent) and 0.0004 mg. trypsin/ml. (=0.8 mg. trypsin; 0.03 percent).

In a further comparison, if there are successively added to 2 l. of the same carboxypeptidase B solution (pH 7.0) with 20.8 CBU/ml. (=41,600 CBU) which contains, as accompanying enzyme, kallikrein with 1,135 KU/ml. (=2,270,000 KU) and trypsin with 1.19 mg. trypsin/ml. (=2,380 mg. trypsin), first 110 g. wet-moist CM-cellulose, the mixture is intensively stirred for 30 minutes, the CM-cellulose sharply filtered off with suction, 130 g. wet-moist DEAE-cellulose are then added to the filtrate, the mixture is again intensively stirred for 30 minutes and the DEAE-cellulose sharply filtered off with suction, a filtrate results with 9.6 CBU/ml. (=19,200 CBU; 46 percent yield) with less than 0.1 KU/ml. (= less than 200 KU; less than 0.01 percent) and 0.009 mg. trypsin/ml. (=18 mg. trypsin; 0.8 percent).

EXAMPLE II

CM-cellulose powder is washed in the sequence mentioned above; once with water, once with methanol, once with water, three times with 0.5 M acetic acid and 10 times with water. The cellulose is sharply filtered off with suction on a suction filter and stored in a wet-moist state.

DEAE-cellulose powder is washed in the sequence mentioned above; once with water, once with methanol, once with water, three times with 0.5 M ammonia and 10 times with water. The cellulose is sharply filtered off with suction on a suction filter and stored in a wet-moist state.

To 2 l. of a carboxypeptidase B solution (pH 6.9) with 14.3 CBU/ml. (=28,600 CBU) which contains, as accompanying enzyme, kallikrein with 1,055 KU/ml. (=2,110,000 KU) and trypsin with 1.28 mg. trypsin/ml. (=2,560 mg. trypsin), there are simultaneously added 100 g. wet-moist DEAE-cellulose pretreated as above and 100 g. wet-moist CM-cellulose pretreated as above. The solution is intensively stirred for 30 minutes and sharply filtered off with suction. The filtrate contains 12.6 CBU/ml. (=25,200 CBU; 88 percent yield), 2.7 KU/ml. (=5,400 KU; 0.26 percent) and 0.0006 mg. trypsin/ml. (=1.2 mg. trypsin; 0.05 percent).

If, by comparison, there are successively added to 2 l. of the same carboxypeptidase B solution (pH 6.9) with 14.3 CBU/ml. (=28,600 CBU) which contains, as accompanying enzyme, kallikrein with 1,055 KU/ml. (=2,110,000 KU) and trypsin with 1.28 mg. trypsin/ml. (=2,560 mg. trypsin), first 100 g. wet-moist DEAE-cellulose, the mixture is intensively stirred for 30 minutes, the DEAE-cellulose sharply filtered off with suction, 100 g. wet-moist CM-cellulose are then added to the filtrate, the mixture is again intensively stirred for 30 minutes and the CM-cellulose sharply filtered off with suction, a filtrate results with 12.0 CBU/ml. (=24,000 CBU; 84 percent yield) with 11 KU/ml. (=22,000 KU; 1 percent) and 0.05 mg. trypsin/ml. (=100 mg. trypsin; 4 percent).

By further comparison, if there are successively added to 2 l. of the same carboxypeptidase B solution (pH 6.9) with 14.3 CBU/ml. (=28,600 CBU) which contains, as accompanying enzyme, kallikrein with 1,055 KU/ml. (=2,110,000 KU) and trypsin with 1.28 mg. trypsin/ml. (=2,560 mg. trypsin), first 100 g. wet-moist CM-cellulose and the mixture is intensively stirred for 30 minutes, the CM-cellulose sharply filtered off with suction, then 100 g. wet-moist DEAE-cellulose are added to the filtrate, the mixture is again intensively stirred for 30 minutes and the DEAE-cellulose sharply filtered off with suction, a filtrate results with 9.4 CBU/ml. (=18,800 CBU; 66 percent yield), with 183 KU/ml. (=366,000 KU; 17.3 percent) and 0.04 mg. trypsin/ml. (=80 mg. trypsin; 3 percent).

The invention has been described herein with reference to certain preferred embodiments. However, as certain variations will become obvious to those skilled in the art, the invention is not to be considered as limited by the scope of the appended claims.

What is claimed is:

1. A process for the purification of carboxypeptidase B which comprises contacting an aqueous solution of carboxypeptidase B simultaneously with cation exchangers and anion exchangers, filtering the resulting mixture and recovering the carboxypeptidase B in the filtrate.

2. A process according to claim 1 wherein the aqueous solution is contacted with the cation and anion exchangers under conditions of agitation at about room temperature.

3. A process according to claim 2 wherein the cation and anion exchangers are based on cellulose, synthetic resins and dextrans.

4. A process according to claim 3 wherein the aqueous solution contains carboxypeptidase B, kallikrein and trypsin.

5. A process according to claim 4 wherein the cation and anion exchangers are employed in substantially equivalent amounts.

6. A process according to claim 1 wherein the crude aqueous as a metals15 B are obtained off the carboxylene-terminal the splitting off B is useful in the therapeutic 7. A process according to claim 4 wherein the ion exchangers are DEAE-cellulose and CM-cellulose.

* * * * *

UNITED STATES PATENT OFFICE

CERTIFICATE OF CORRECTION

Patent No. 3,625,829 Dated December 7, 1971

Inventor(s) Gunther Schmidt-Kastner and Johann Putter

It is certified that error appears in the above-identified patent and that said Letters Patent are hereby corrected as shown below:

Column 1, line 11, "peptidehydorlase" should read --peptidehydrolase--.

Column 2, lines 38-39, "washingin" should read --washing in--.

Table 1, under headings "Kallikrein" and "Trypsin" there should be a % sign.

Clain 6 should be corrected to read as follows:

--6. A process according to claim 1 wherein the crude aqueous solutions of carboxypeptidase B are obtained from pancrease extracts.--

Signed and sealed this 27th day of June 1972.

(SEAL)
Attest:

EDWARD M.FLETCHER,JR.
Attesting Officer

ROBERT GOTTSCHALK
Commissioner of Patents